Aug. 1, 1933.  S. F. KNEFEL ET AL  1,920,510
BOILER RETURN AND VACUUM TRAP
Filed Oct. 10, 1932    2 Sheets-Sheet 2
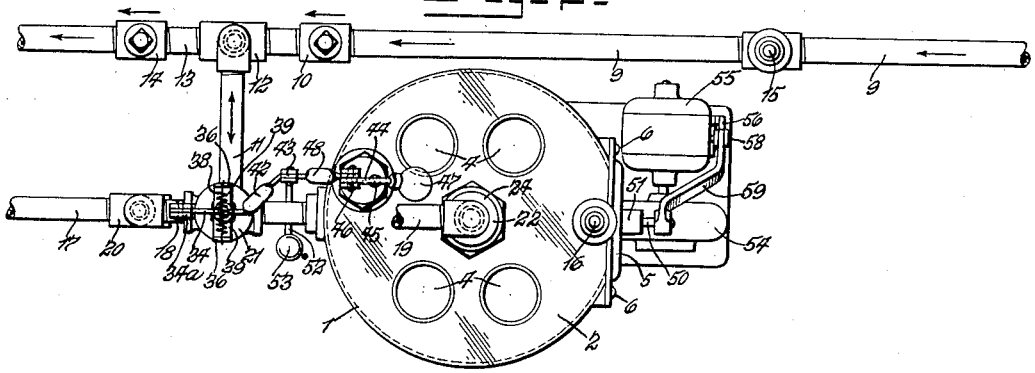
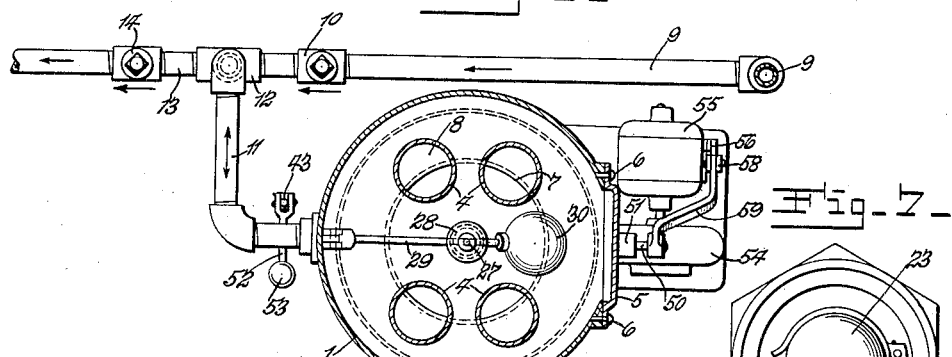
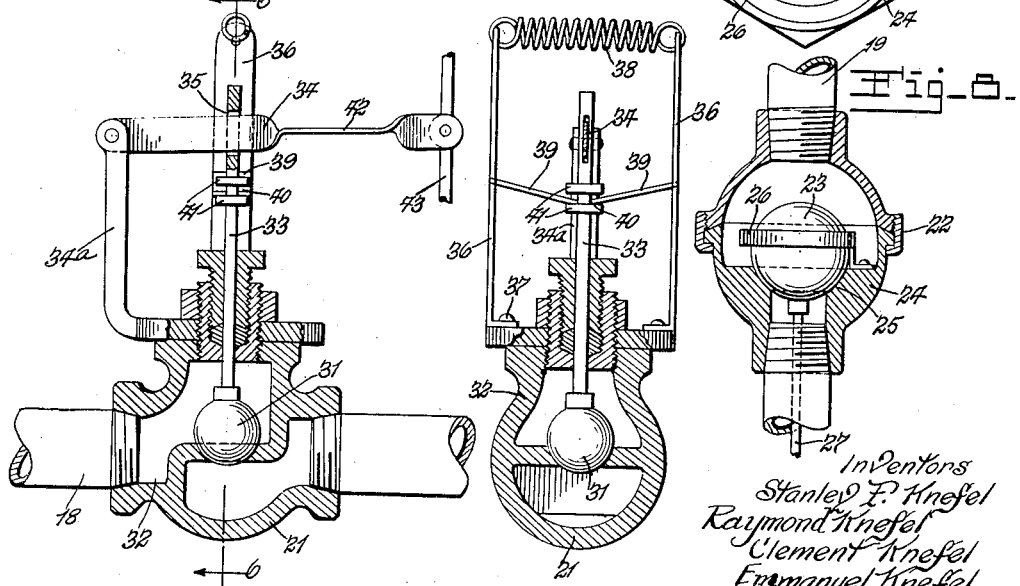

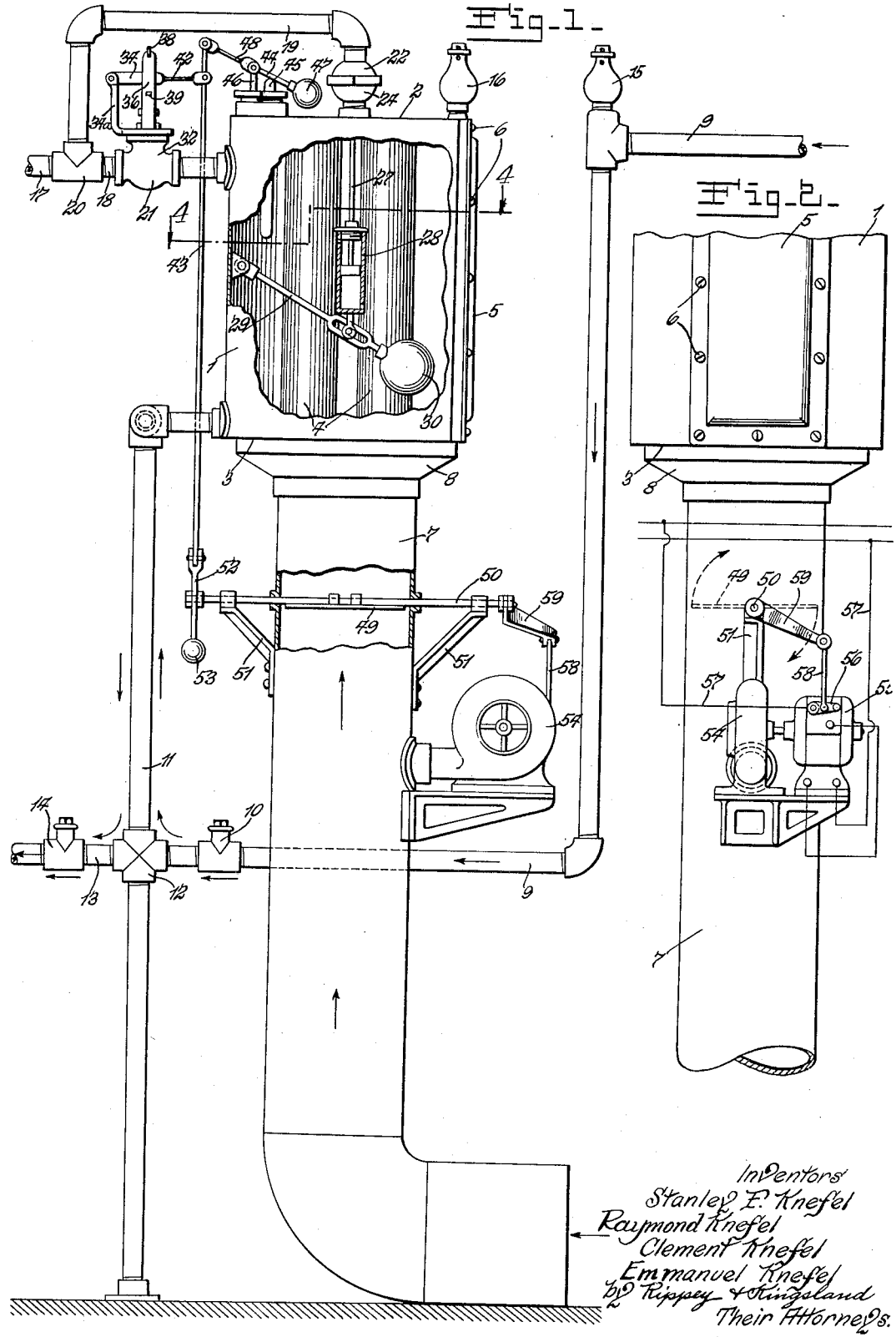

Patented Aug. 1, 1933

1,920,510

UNITED STATES PATENT OFFICE 1,920,510

BOILER RETURN AND VACUUM TRAP

Stanley F. Knefel, Raymond Knefel, Clement Knefel, and Emmanuel Knefel, St. Louis, Mo.

Application October 10, 1932. Serial No. 636,998

8 Claims. (Cl. 103—252)

This invention relates to an improved boiler return and vacuum trap for use in connection with steam boilers to control the return to the boiler of water resulting from condensation of steam in a system to which steam is supplied by the boiler, and more particularly to that class of inventions constituting the subject matter of Patent No. 1,783,381, granted December 2, 1930 to Stanley C. Knefel.

An object of this invention is to provide an improved vacuum trap and equipment therefor of such a nature as to control passage to the trap of water from the system produced by condensation of steam in the system and for conducting the water to the boiler, in combination with improved means for utilizing the steam from the boiler to force the water from the trap, and improved means for condensing the steam in the trap to create a vacuum and thereby cause or permit water from the system to enter the trap, and to provide means whereby these operations are repeated automatically and as an incident to the operation of the boiler.

Another object of the invention is to provide an improved trap constituting a unit of the invention for receiving from the system water produced by the condensation of steam and means for utilizing in the trap steam from the boiler to force the water therefrom and to provide an improved cooling means for the trap.

Other objects will be apparent from the following detail description taken in connection with the accompanying drawings, in which—

Fig. 1 is an elevation showing an embodiment of the invention.

Fig. 2 is an elevation taken at an angle of 90° from that of Fig. 1.

Fig. 3 is a plan view.

Fig. 4 is a section on line 4—4, Fig. 1.

Fig. 5 is a vertical section of one of the valves controlling the passage of steam into the trap.

Fig. 6 is a vertical section on line 6—6, Fig. 5.

Fig. 7 is a plan view of one of the valves controlling the passage of steam into the trap with the housing removed.

Fig. 8 is a vertical section of the valve shown in Fig. 7.

A condenser tank 1 has a top wall 2 and a bottom wall 3. A plurality of vertical flues 4 extend through the top wall 2 and the bottom wall 3 having their ends open outside the tank. In the embodiment specifically illustrated in the drawings the tank 1 is substantially cylindrical and for convenience has a removable cover plate 5 secured to the cylindrical wall of the tank by screws 6.

A draft tube 7, which may be extended to any cool or cold place to take in cool or cold air, communicates with the bottom end of the flues 4 by means of a funnel 8. The flues 4 are spaced from each other in such a manner that their outer surfaces are fully exposed to any steam which may be conducted to the interior of the condenser 1. The upper ends of the flues 4 are open to atmosphere. The arrangement is such that when steam is introduced into the condenser 1 air will freely circulate through the draft tube 7 upwardly and through the flues 4 due to the heating action of the steam and the steam in the trap will thereby be condensed. A return pipe 9 extends to and communicates with the system to which steam is supplied by the boiler and is adapted to return water produced by condensation to steam in the system. A check valve 10 in the pipe 9 permits water to flow in the direction of the arrow, that is, from the system and prevents it flowing in the opposite direction. The pipe 9 communicates with a pipe 11 through a connection 12. The pipe 11 connects into the condenser 1. A pipe 13 communicates through the connection 12 with the pipe 11 and is adapted to return water from the condenser 1 to the boiler not shown in the drawings. A check valve 14 is placed in the pipe 13 and permits the water to flow in the direction of the arrow as indicated on the drawings, that is, to the boiler and prevents it from flowing in the reverse direction.

The pipe 9 is equipped with an air exhaust valve or device 15 of any standard commercial type of construction and arrangement which are well known. This valve or device 15 is adapted to permit air to escape from the pipe 9 without permitting the escape of steam to any substantial extent. The condenser 1 is also equipped with an air exhaust valve or device 16 of the same nature as the valve 15.

A pipe 17 leads to the boiler, not shown, and is adapted to discharge live steam into the condenser through the pipes 18 and 19 which are connected to the pipe 17 by a coupling 20.

The discharge of steam into the condenser 1 through the pipe 18 is controlled by a valve 21 and the discharge of steam into the condenser 1 by a pipe 19 is controlled by a valve 22.

The valve 22 includes a globe valve member 23 mounted in a valve housing 24 and is movable to and from a valve seat 25 in a guide 26. A push rod 27 is secured to the valve member 23 and is adapted to open and close communication between the pipe 19 and the condenser 1. The rod 27 is connected through a lost motion link 28 to a float lever 29 which carries a float 30 at its outer end. The arrangement is such that the valve 22 will normally be closed and will be opened by the float 30 when the water in the condenser 1 reaches a predetermined level.

The valve 21 includes a globe valve member 31 in a housing 32 which is movable to and from its seat by a rod 33 to which it is connected. The rod 33 is moved vertically by a lever 34 which passes through a slot 35 in the upper end of the rod 33 and is pivoted at one end to a bracket 34a. The arrangement which will presently be described is such as to cause the valve member 31 to be opened and closed with a snap. A pair of resilient upright members 36 are secured at their base to the housing 32 by screws 37; their upper ends are connected by a spring 38. A pair of resilient cross members 39 each has one end engaging a vertical member 36 and the other end engaging in a slot 40 formed by a pair of collars 41 on the rod 33. The outer end 42 of the lever 35 is resilient.

The extreme end of the lever 35 is pivotally connected to a push rod 43 which is adapted to be moved through a lever 44 by a thermostatic device 45 which is supported within the condenser 1 in an appropriate manner and is constructed in a familiar way so as to move the member 45 outwardly when heated beyond a predetermined degree and to move the member inwardly when the temperature is reduced below a predetermined degree. Thermostatic devices for imparting such movement are quite well known and no specific illustration of the device is required. The lever 44 is pivoted on a bracket 46 and has one arm in abutting engagement with the thermostatic member 45 and its other arm pivotally connected to the push rod 43. The extreme end of the lever 44 carries a weight 47 which moves the lever 44 in a direction opposed to that caused by the upward movement of the thermostatic element 45. The arm 48 of the lever 44 between the fulcrum and the pivotal connection with the rod 43 is resilient. The arrangement is such, as will be obvious from the following description, that a drop in temperature to a predetermined degree in the condenser 1 will cause the valve 21 to open permitting steam to enter the condenser 1 through the pipe 17 from the boiler. Upon a rise in temperature in the condenser 1 to a predetermined degree the valve 21 will be closed.

A damper 49 of the rotating type is supported on a rock shaft 50 in the draft tube 7. The rock shaft 50 is supported by and journalled in brackets 51 and is fixed at one end to a lever 52 by which it may be operated. One end of the lever 52 is connected pivotally to the push rod 43 and the other end carries a weight 53. The arrangement is such that when the thermostatic element 45 moves upwardly to move the lever 44 the damper 49 will be opened permitting cold air to circulate through the flues 4.

In some installations it may be necessary or desirable to produce a forced circulation through the flues 4 and in such a case a blower 54 may be provided which is connected into the draft tube 7 and driven by an electric motor 55. A switch device 56 is arranged to open and close an electric circuit 57 which furnishes a source of current supply for the motor 55. The switch device 56 is connected by a link 58 to a bell crank lever 59 which is secured to one end of the rock shaft 50. It will be obvious, therefore, that the fan 54 will be placed in operation upon a sufficient drop in temperature in the condenser 1 and simultaneously with the introduction of steam to the condenser through the valve 21.

When steam is generated in the boiler it enters the trap through the pipe 17 and the valve 21. After sufficient steam has entered the condenser 1 to heat the thermostatic element 45 the valve 21 will be closed, the damper 49 will be opened and the blower 54, when employed, will be placed in operation. The current of air will be induced or conducted through the flues 4 and the steam will be condensed in the condenser 1, thus causing a vacuum to be formed drawing water from the system through the pipes 11 and 9. As soon as water has risen in the condenser 1 to a predetermined level the float 30 will cause the valve 22 to be opened and steam will be introduced into the condenser through the pipes 17 and 19 and the valve 22 from the boiler. This will cause equalization of the pressure in the condenser 1 with the boiler and will permit the water in the condenser to flow through the pipes 11 and 13 and the check valve 14 in return to the boiler. These operations will be continued and repeated automatically when necessary to maintain a vacuum in the condenser 1 and to return the condensed water to the boiler.

Various changes may be made in the details of construction, within the scope of the appended claims, without departing from the spirit of this invention.

I claim:

1. A device of the character described comprising a combined condenser and vacuum trap, a valve for admitting steam into said condenser and trap, vertical flues passing through the condenser and open at their top to atmosphere, a draft tube communicating with the flues at their bottom, a damper for opening and closing the tube, an actuator controlled by the temperature in said condenser and trap for opening and closing said valve and said damper, an inlet and outlet for pumped liquid, a float, and a steam inlet controlled by the float to provide pressure for forcing the liquid from the condenser.

2. A device of the character described comprising a combined condenser and vacuum trap, a valve for admitting steam into said condenser and trap, vertical flues passing through the condenser and open at their top to atmosphere, a draft tube communicating with the flues at their bottom, a damper for opening and closing the tube, an actuator controlled by the temperature in said condenser and trap for opening and closing said valve and said damper, resilient means for returning the action of said valve, an inlet and outlet for pumped liquid, a float, and a steam inlet controlled by the float to provide pressure for forcing the liquid from the condenser.

3. A device of the character described comprising a combined condenser and vacuum trap, a valve for admitting steam into said condenser and trap, vertical flues passing through the condenser and open at their top to atmosphere, a header connecting said flues at their bottom, a draft tube connected into said header, a damper for opening and closing the tube, an actuator controlled by the temperature in said condenser and trap for opening and closing said valve and said damper, an inlet and outlet for pumped liquid, a float, and a steam inlet controlled by the float to provide pressure for forcing the liquid from the condenser.

4. A device of the character described comprising a combined condenser and vacuum trap, a valve for admitting steam into said condenser and trap, tubes extending through said condenser and trap, means for causing air to pass through said tubes, an actuator controlled by the temperature in said condenser and trap for opening and closing said valve, yielding means adapted to maintain said valve open and closed substantially beyond the temperatures respectively that said actuator tends to open and close the same, an inlet and outlet for pumped liquid, a float, and a steam inlet controlled by the float to provide pressure for forcing the liquid from the condenser.

5. A device of the character described comprising a combined condenser and vacuum trap, means for admitting water into said condenser and trap, a valve for admitting steam into said condenser and trap, vertical flues passing through the condenser and open at their top to atmosphere, a draft tube communicating with the flues at their bottom, automatic means for opening said valve to admit steam to the condenser when the condenser becomes filled with water, an outlet for pumped liquid, and a steam inlet controlled by the temperature to provide steam for condensation purposes.

6. A device of the class described comprising walls forming an enclosure constituting a combined condenser and trap, means for admitting water into said enclosure, a pipe having two openings for admitting steam into said enclosure, flues extending vertically through the bottom and top walls of said enclosure, a draft tube communicating with the flues at their bottom, a valve for opening and closing each of said openings to said enclosure from said pipe, automatic means controlled by the water entering said enclosure for opening and closing one of said valves, automatic means controlled by variations of temperature for opening and closing the other valve and an outlet for pumped liquid.

7. In a device of the character described having a combined condenser and vacuum trap, a valve for controlling the introduction of steam into said condenser and trap, a lever, a thermostatic element controlled by the temperature in the condenser and trap and adapted to move said lever, means for opening and closing said valve, resilient connection interposed between said means and said lever, an inlet and outlet for pumped liquid, a float, and a steam inlet controlled by the float to provide pressure for forcing the liquid from the condenser.

8. A device of the character described comprising a combined condenser and vacuum trap, a valve for admitting steam into said condenser and trap, vertical flues passing through the condenser and open at their top to atmosphere, a draft tube communicating with the flues at their bottom, a damper for opening and closing the tube, a lever, a thermostatic element controlled by the temperature in the condenser and trap and adapted to move the lever, a rod connected to said lever and adapted to open and close the damper, means for opening and closing said valve, resilient connecting means interposed between said valve operating means and the rod, an inlet and outlet for pumped liquid, a float, and a steam inlet controlled by the float to provide pressure for forcing the liquid from the condenser.

STANLEY F. KNEFEL.
RAYMOND KNEFEL.
CLEMENT KNEFEL.
EMMANUEL KNEFEL.